(12) United States Patent
Lu et al.

(10) Patent No.: US 11,174,164 B2
(45) Date of Patent: Nov. 16, 2021

(54) HONEYCOMB-LIKE HOMO-TYPE HETEROJUNCTION CARBON NITRIDE COMPOSITE MATERIAL AND PREPARATION METHOD THEREOF, AND APPLICATION IN CATALYTIC TREATMENT OF WASTE GAS

(71) Applicant: SOOCHOW UNIVERSITY, Suzhou (CN)

(72) Inventors: Jianmei Lu, Suzhou (CN); Dongyun Chen, Suzhou (CN); Jun Jiang, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 432 days.

(21) Appl. No.: 16/396,611

(22) Filed: Apr. 26, 2019

(65) Prior Publication Data

US 2019/0330061 A1 Oct. 31, 2019

(30) Foreign Application Priority Data

Apr. 28, 2018 (CN) .......................... 201810403004.2

(51) Int. Cl.

| | | |
|---|---|---|
| *C01B 21/06* | (2006.01) | |
| *B01J 27/24* | (2006.01) | |
| *B01J 35/00* | (2006.01) | |
| *B01J 35/04* | (2006.01) | |
| *F01N 3/022* | (2006.01) | |
| *F01N 3/08* | (2006.01) | |
| *B01D 53/86* | (2006.01) | |
| *F01N 3/28* | (2006.01) | |

(52) U.S. Cl.
CPC ...... *C01B 21/0605* (2013.01); *B01D 53/8628* (2013.01); *B01J 27/24* (2013.01); *B01J 35/004* (2013.01); *B01J 35/04* (2013.01); *F01N 3/0222* (2013.01); *F01N 3/0842* (2013.01); *F01N 3/2803* (2013.01); *C01P 2004/03* (2013.01); *C01P 2004/04* (2013.01); *F01N 2370/00* (2013.01); *F01N 2510/06* (2013.01)

(58) Field of Classification Search
None
See application file for complete search history.

(56) References Cited

FOREIGN PATENT DOCUMENTS

CN 106944119 * 3/2017

OTHER PUBLICATIONS

Zhang, Yu, et al. "Synthesis of graphitic carbon nitride by heating mixture of urea and thiourea . . . ". International Journal of Hydrogen Energy. 42. 143-151 (2017). (Year: 2017).*

* cited by examiner

*Primary Examiner* — Sheng H Davis
(74) *Attorney, Agent, or Firm* — SZDC Law P.C.

(57) ABSTRACT

Disclosed are a honeycomb-like homo-type heterojunction carbon nitride composite material and a preparation method thereof, and an application of the honeycomb-like homo-type heterojunction carbon nitride composite material in catalytic treatment of waste gas. The preparation method includes the following steps: with two different carbon nitride precursors namely urea and thiourea as raw materials, weighing certain amounts of the urea and the thiourea, adding the urea and the thiourea into a crucible, adding a certain amount of ultrapure water, placing the crucible in a muffle furnace, and carrying out calcination molding. The honeycomb-like homo-type heterojunction carbon nitride prepared by the one-step method has good photocatalytic effect to catalytic degradation of NO; meanwhile, the honeycomb-like homo-type heterojunction carbon nitride composite material has the advantages of rich and easily-available production raw materials, good stability, reusability, etc., and has application prospects in the field of treatment of NO in the air.

5 Claims, 3 Drawing Sheets

HONEYCOMB-LIKE HOMO-TYPE HETEROJUNCTION CARBON NITRIDE COMPOSITE MATERIAL AND PREPARATION METHOD THEREOF, AND APPLICATION IN CATALYTIC TREATMENT OF WASTE GAS

This application claims priority to Chinese Patent Application No.: 201810403004.2, filed on Apr. 28, 2018, which is incorporated by reference for all purposes as if fully set forth herein.

FIELD OF THE INVENTION

The present invention relates to the field of composite materials, particularly relates to a composite of honeycomb-like carbon nitride isotype heterojunction and its preparation method and application in treatment of NO.

TECHNICAL BACKGROUND

With the rapid development of the automotive industry in recent years, the emissions of automobile exhaust gas have exceeded the standard, which has damaged the ecological environment and harmed human health.

Semiconductor photocatalysis is a highly appealing and promising technology with broad applications in environmental remediation, solar energy conversion, and photosynthesis. Since first reported by Wang et al., graphitic carbon nitride ($g-C_3N_4$) has attracted intensive research interest as a fascinating visible light photocatalyst. However, the prior art results in a lower yield of $g-C_3N_4$. Thus, high yield synthesis of new high-performance $g-C_3N_4$ method needs to find.

SUMMARY OF THE INVENTION

The purpose of this invention is to provide a honeycomb-like homo-type heterojunction carbon nitride composite material and preparation method thereof. Creatively, in the presence of water, a one-step calcination method is used to prepare urea and thiourea into honeycomb-like carbon nitride isotype heterojunction to achieve the treatment of NO in exhaust gas.

In order to achieve the above purposes, the invention adopts the following specific technical scheme:

A preparation method of a honeycomb-like homo-type heterojunction carbon nitride composite material, comprising the following steps: using urea and thiourea as precursors, in the presence of water, calcining the precursors to obtain the honeycomb-like homo-type heterojunction carbon nitride composite material.

The present invention further discloses a treatment method of exhaust gas, comprising the steps of: using urea and thiourea as precursors, in the presence of water, calcining the precursors to obtain the honeycomb-like homo-type heterojunction carbon nitride composite material; and then letting the exhaust gas pass through the honeycomb-like homo-type heterojunction carbon nitride composite material to complete the exhaust gas treatment.

Preferably, urea and thiourea are mixed in the presence of water and then calcined into the composite of honeycomb-like carbon nitride isotype heterojunction, more preferably, the reaction is room temperature reaction for 20-45 minutes. When mixed and dissolved, it is a room temperature reaction, the operating conditions are simple, the experiment cost is reduced, and the loss of urea and thiourea is small.

In the present invention, the mass ratio of urea and thiourea to water is 5:(6 to 7); the quality of thiourea is between 1% and 10% of the total mass of urea and thiourea. The invention uses urea added with water, and has no template, thereby forming a honeycomb structure of carbon nitride, which is more environmentally friendly and pollution-free than the prior art (urea plus ammonium salt), and secondly, the present invention is also doped with thiourea, thereby, a honeycomb carbon nitride homojunction is formed, which further increases the catalytic effect.

In the invention, the calcination is carried out in air, including first calcination and second calcination. The first calcination is carried out at 400° C. for 1 h with a heating rate of 10° C./min in air, the second calcination is carried out at 450° C. for 1 h with a heating rate of 10° C./min in air. The invention realizes the nanocomposite of t honeycomb-like carbon nitride isotype heterojunction and the excellent catalytic performance, at the same time, which solves the problem that the high-temperature treatment of the prior art makes the yield of $g-C_3N_4$ lower.

In the inventive, the simple one-step calcining method of composite material of honeycomb-like carbon nitride isotype heterojunction with a honeycomb-like structure, a small band gap, large output, and a low cost, the honeycomb-like structure is a good semiconductor catalyst promotes catalytic performance.

In the invention, the treatment of NO gas under the visible-light irradiation.

The invention also discloses a preparation method of composite material of honeycomb-like carbon nitride isotype heterojunction.

The present invention further discloses the application of the above-mentioned composite material of honeycomb-like carbon nitride isotype heterojunction in the treatment of exhaust gas, preferably the exhaust gas is NO. Further preferably, the catalytic treatment is performed under light irradiation.

Advantages of the Present Invention

1. In the invention, the honeycomb-like carbon nitride isotype heterojunction with a honeycomb-like structure, a small band gap, large output, and a low cost, can promote the catalytic performance, it is a good semiconductor catalyst.

2. In the invention, graphitic carbon nitride ($g-C_3N_4$), a metal-free, conjugated, polymeric semiconductor, and it has high physicochemical stability, favorable electronic band structure and facile synthesis by thermal polymerization of abundant nitrogen-rich precursors. However, owing to a high recombination rate of charge carriers, low electrical conductivity, and low specific surface area (7.7 $m^2g^{-1}$) in bulk $C_3N_4$, native $C_3N_4$ still has limitations in practical applications. This invention regulates the electronic structure and optical properties, enlarges the specific surface area, reduces the recombination rate of the charges, while improves the photocatalytic efficiency.

3. In the invention, the preparation method of the composite of honeycomb-like carbon nitride isotype heterojunction are simple. Cheap raw materials, low cost and high yield. The formed honeycomb-like morphology has high reproducibility and has a high utilization of light absorption, the resulting product can efficiently treat NO in the exhaust gas.

DETAILED DESCRIPTION OF THE INVENTION

Implementation 1

Preparation of the honeycomb-like carbon nitride isotype heterojunction, the specific steps are as follows:

In a typical synthesis, the urea and thiourea (a total of 15 g) were mixed in 20 mL ultrapure water at room temperature and ultrasonicated for 30 min. The as-obtained mixture was then put in an alumina crucible with a cover and heated in a muffle furnace. The temperature was raised to 400° C. with a ramping rate of 10° C./min and was kept at this temperature for 1 h. After which, the temperature was further increased to 450° C. and maintained at this temperature for 1 h. To investigate the effect of thiourea mass ratios on the photoactivity of this isotype heterojunction, different weight percentage of thiourea in (urea+thiourea) were selected (0%, 1%, 2%, 5%, 10% and 100%) and discussed.

Figure 1:
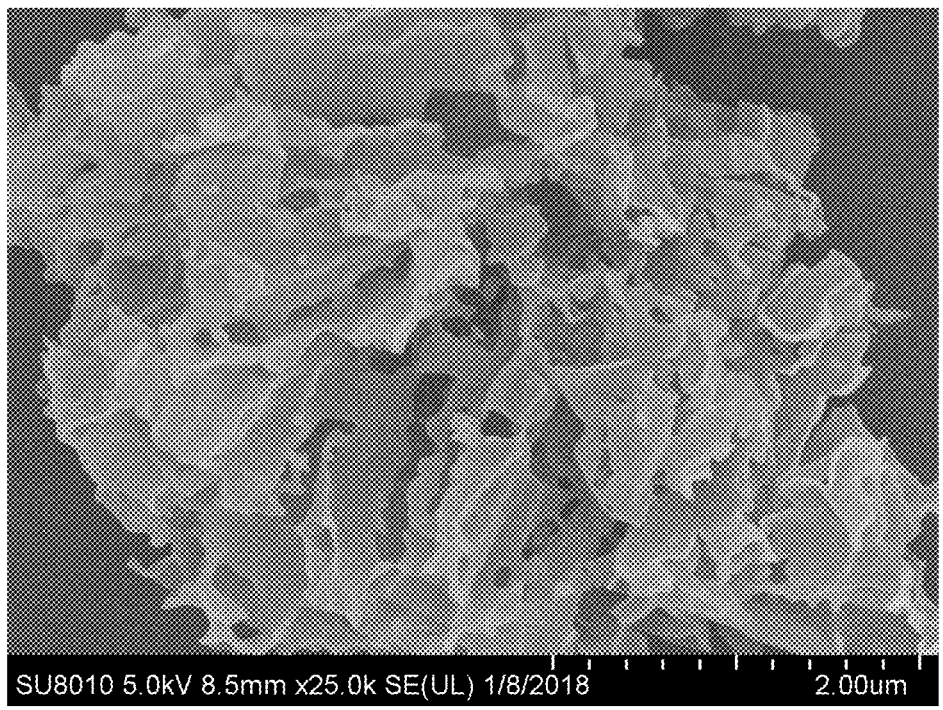
FIG. 1 is the SEM image of the honeycomb-like carbon nitride isotype heterojunction after calcination at 450° C.
Figure 2:
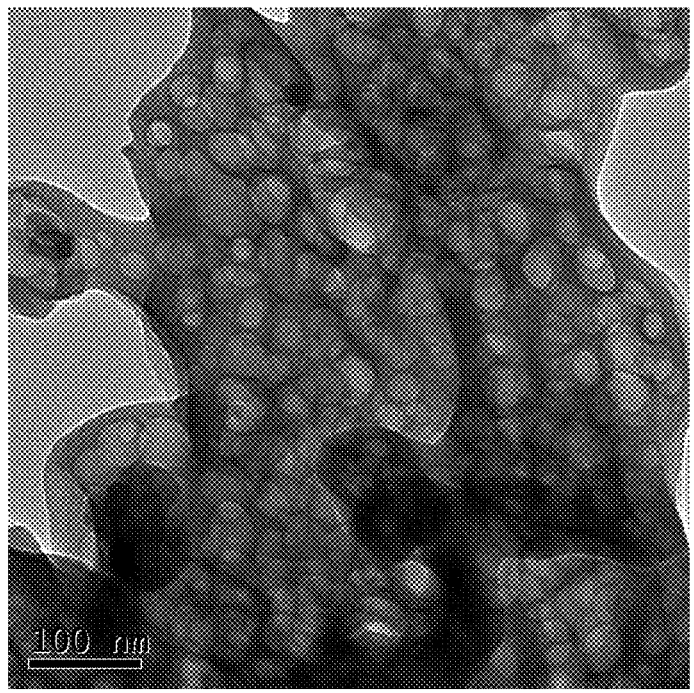
FIG. 2 is the TEM images of the honeycomb-like carbon nitride isotype heterojunction after calcination at 450° C.

FIG. 1 showed the SEM images of the honeycomb-like carbon nitride isotype heterojunction after calcination at 450° C. It can be seen from the figure that some holes are irregularly scattered on the surface of the carbon nitride. FIG. 2 showed the TEM images of the honeycomb-like carbon nitride isotype heterojunction after calcination at 450° C. From the figure, it can be seen more clearly and intuitively that there are a large number of cellular voids distributed in the carbon nitride layers, with inconsistent pore sizes and irregular shapes.

Implementation 2

Photocatalytic Activity to NO

The volume of the cylindrical reactor made of glass was 1.6 L (Φ10×20 cm) and 50 mg of catalyst was placed in the center of it. The Xenon lamp was vertically placed outside the reactor above the reactor. NO gas was supplied by a compressed gas cylinder at a concentration of 100 ppm of NO ($N_2$ balance). The initial concentration of NO was diluted to about 600 ppb via air stream provided by a compressed air cylinder. The two gas streams were premixed in a three-way valve and the flow rate of the mixed gas was controlled at 2.4 L $min^{-1}$. The desired humidity level of the air flow was controlled at 50% by passing the air stream through a humidification chamber. When the adsorption-desorption equilibrium among photocatalyst, gas and water vapor was achieved, the Xenon lamp was turned on. The concentration of NO was consequently measured every one minute by using a $NO_x$ analyzer (Thermo Environmental Instruments, Inc., 42i-TL).

Figure 3:
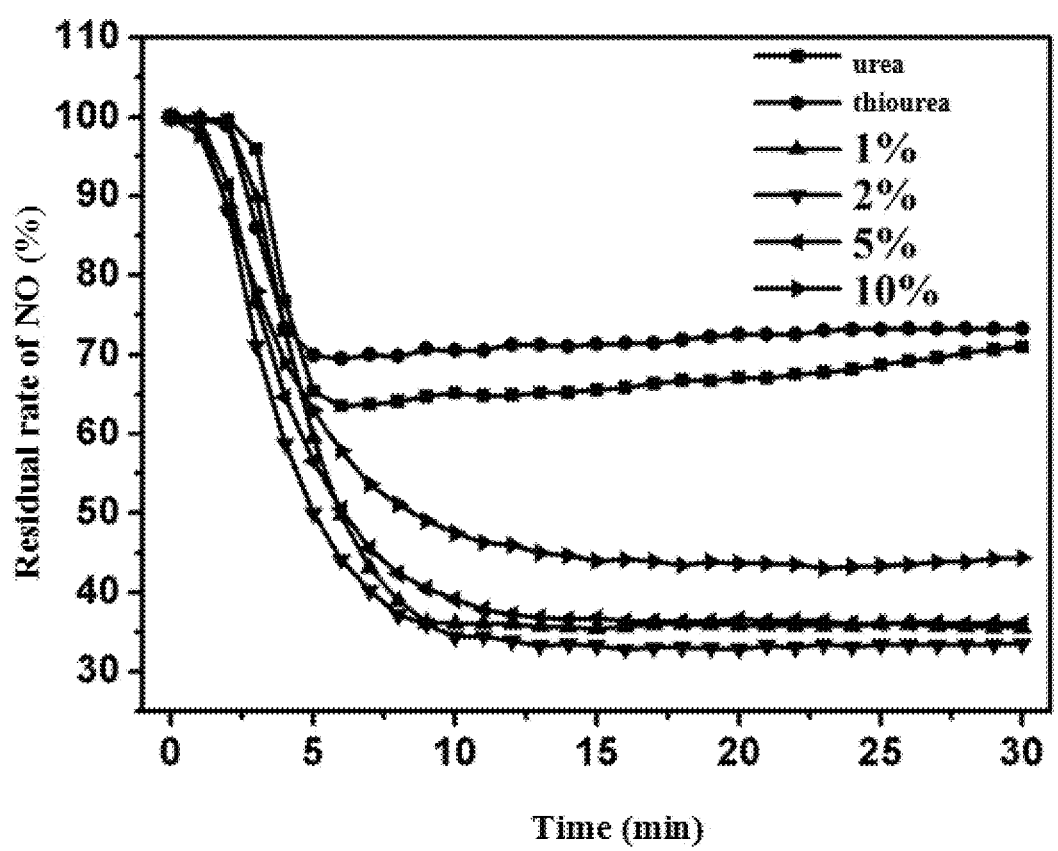
FIG. 3 shows the visible-light photocatalytic activities of the honeycomb-like carbon nitride isotype heterojunction for removal of NO in air.

FIG. 3 showed the visible-light photocatalytic activities of the honeycomb-like carbon nitride isotype heterojunction for removal of NO in air. It can be seen from the figure that about 65% of NO is removed catalytically within 10 minutes under light irradiation conditions in the composite photocatalyst of the honeycomb-like carbon nitride isotype heterojunction; after 30 minutes, the NO concentration keep steady. In this experiment, due to the formation of isotype heterojunction with urea and thiourea, as well as honeycomb morphology, the catalytic efficiency of photocatalysts for NO was substantially increased.

Implementation 3

Cyclic Experiment

After the end of the implementation 2, turn off the xenon lamp and wait for the concentration of gas NO to return to 600 ppb again and keep it stable. After the adsorption equilibrium is reached, turn on the xenon lamp and start timing. Record the data for 30 minutes. After that, the above operation was repeated and recorded four times to obtain the catalyst cycle data.

Figure 4:
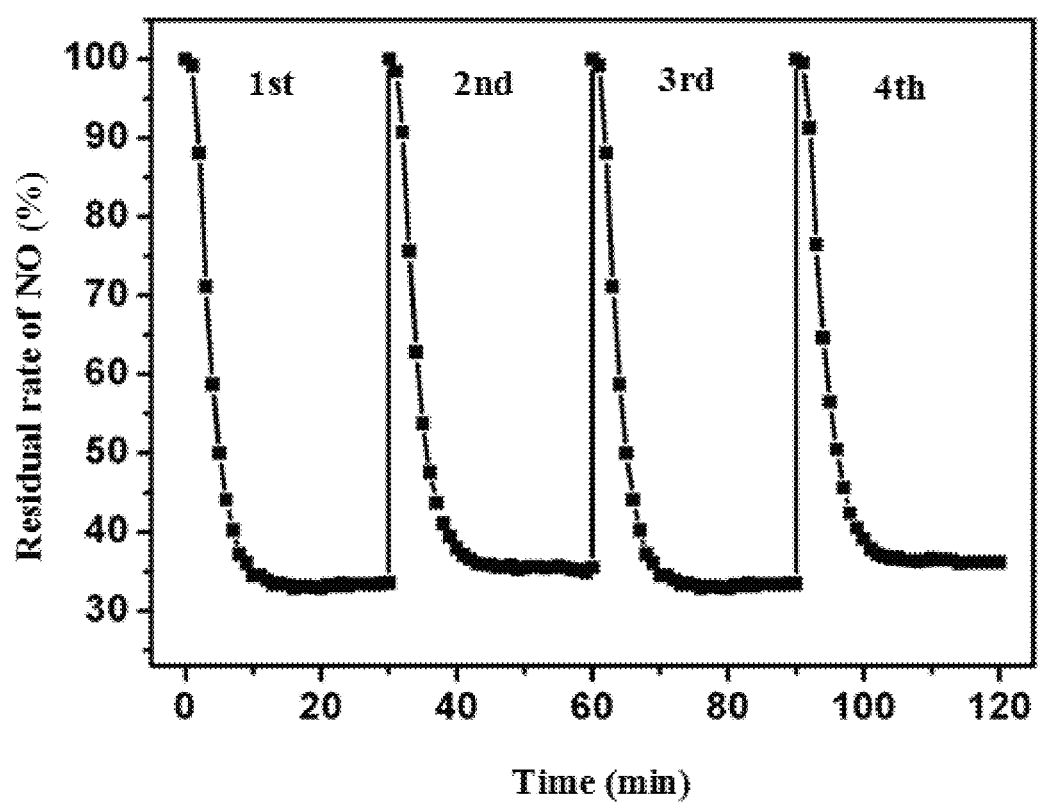
FIG. 4 shows the cycling run in the photocatalytic reaction process.

FIG. 4 showed the cycling run in the photocatalytic reaction process. In the experiment, it can be seen that during the above three repeated uses, the composite material has high stability and always maintains excellent photocatalytic performance. Under the NO concentration of 600 ppb, the final removal efficiency of NO is more than 65%. Therefore, the catalyst can be reused and has good stability.

In the invention, the honeycomb-like carbon nitride isotype heterojunction, a metal-free, conjugated, "earth-abundant" polymeric semiconductor, and it has high physicochemical stability, favorable electronic band structure and facile synthesis by thermal polymerization of abundant nitrogen-rich precursors. In particular, urea is a very inexpensive and abundant industrial reagent and is a good precursor.

What we claim is:

1. A preparation method of a homo-type heterojunction carbon nitride composite material, comprising the following steps:
    using urea and thiourea as precursors, in the presence of water, mixing urea, thiourea and water to react, calcining the precursors to obtain the homo-type heterojunction carbon nitride composite material,
    wherein the calcination is carried out in air; and the calcination includes a first calcination and a second calcination, and
    wherein the reaction of urea, thiourea and water is carried out at room temperature for 20 to 45 minutes; and in the first calcination, a heating rate is 10° C./min, a calcination time is 1 h, and a calcination temperature is 400° C.; in the second calcination, a heating rate is 10° C./min, a calcination time is 1 h, and a calcination temperature is 450° C.

2. The preparation method of a homo-type heterojunction carbon nitride composite material according to claim 1, wherein a mass ratio of urea and thiourea to water is 5:(6 to 7); a quality of thiourea is between 1% and 10% of the total mass of urea and thiourea.

3. A treatment method of exhaust gas, comprising the steps of:
    using urea and thiourea as precursors, in the presence of water, mixing urea, thiourea and water to react, calcining the precursors to obtain a homo-type heterojunction carbon nitride composite material; and then letting an exhaust gas pass through the homo-type heterojunction carbon nitride composite material to complete an exhaust gas treatment,
    wherein the calcination is carried out in air; the calcination includes a first calcination and a second calcination; and the exhaust gas treatment is taken under a light, and wherein the reaction of urea, thiourea and water is carried out at room temperature for 20 to 45 minutes; and in the first calcination, a heating rate is 10° C./min, a calcination time is 1 h, and a calcination temperature is 400° C.; in the second calcination, a heating rate is 10° C./min, a calcination time is 1 h, and a calcination temperature is 450° C.; and the light is 300W xenon illumination.

4. The treatment method of exhaust gas according to claim 3, wherein a mass ratio of urea and thiourea to water is 5:(6 to 7); a quality of thiourea is between 1% and 10% of the total mass of urea and thiourea.

5. A homo-type heterojunction carbon nitride composite material prepared by the preparation method of the homo-type heterojunction carbon nitride composite material according to claim 1.

* * * * *